(12) United States Patent
Pantelias

(10) Patent No.: US 9,455,842 B2
(45) Date of Patent: Sep. 27, 2016

(54) HALF-FRAME REQUEST OPPORTUNITIES AND OPERATION WITHIN WIRED AND/OR WIRELESS COMMUNICATION SYSTEMS

(71) Applicant: BROADCOM CORPORATION, Irvine, CA (US)

(72) Inventor: Niki R. Pantelias, Duluth, GA (US)

(73) Assignee: BROADCOM CORPORATION, Irvine, CA (US)

( * ) Notice: Subject to any disclaimer, the term of this patent is extended or adjusted under 35 U.S.C. 154(b) by 125 days.

(21) Appl. No.: 14/189,386

(22) Filed: Feb. 25, 2014

(65) Prior Publication Data
US 2014/0241377 A1 Aug. 28, 2014

Related U.S. Application Data

(60) Provisional application No. 61/769,380, filed on Feb. 26, 2013, provisional application No. 61/939,042, filed on Feb. 12, 2014.

(51) Int. Cl.
| | |
|---|---|
| *H04L 12/42* | (2006.01) |
| *H04L 12/403* | (2006.01) |
| *H04W 74/00* | (2009.01) |
| *H04L 27/26* | (2006.01) |
| *H04L 12/28* | (2006.01) |

(52) U.S. Cl.
CPC ......... *H04L 12/403* (2013.01); *H04L 27/2602* (2013.01); *H04W 74/002* (2013.01); *H04L 12/2801* (2013.01)

(58) Field of Classification Search
CPC .. H04L 12/403; H04W 74/06; H04W 84/12; H04W 74/0816
See application file for complete search history.

(56) References Cited

U.S. PATENT DOCUMENTS

| | | | | |
|---|---|---|---|---|
| 5,963,557 A | * | 10/1999 | Eng | H04H 20/42 348/E7.07 |
| 2002/0154620 A1 | * | 10/2002 | Azenkot | H04L 5/026 370/347 |
| 2009/0028119 A1 | * | 1/2009 | Avidor | H04W 72/1247 370/338 |
| 2010/0278123 A1 | * | 11/2010 | Fong et al. | 370/329 |
| 2011/0134935 A1 | * | 6/2011 | Campos | H04J 3/1647 370/436 |

* cited by examiner

*Primary Examiner* — Hassan Phillips
*Assistant Examiner* — Siren Wei
(74) *Attorney, Agent, or Firm* — Garlick & Markison; Shayne X. Short

(57) ABSTRACT

A communication device is configured to receive a message that indicates request opportunity parameter(s). Based on the request opportunity parameter(s), the communication device is configured to generate and transmit a transmission request within one of two or more request opportunities (e.g., 2, 3, 4, etc. or generally N request opportunities such that N is a positive integer greater than or equal to 2) indicated by the request opportunity parameter(s). The two or more request opportunities are included within mini-slot(s) that span OFDM sub-carrier(s) of OFDM or OFDMA framing. A given mini-slot spans an OFDM or OFDMA frame, and a mini-slot is divided into any desired number of portions (e.g., 2, 3, 4, etc. or generally N portions) such that each of the request opportunities within that mini-slot occupies a common fraction of the mini-slot (e.g., each occupies ½, ⅓, ¼, etc. or generally 1/N of the mini-slot).

20 Claims, 8 Drawing Sheets

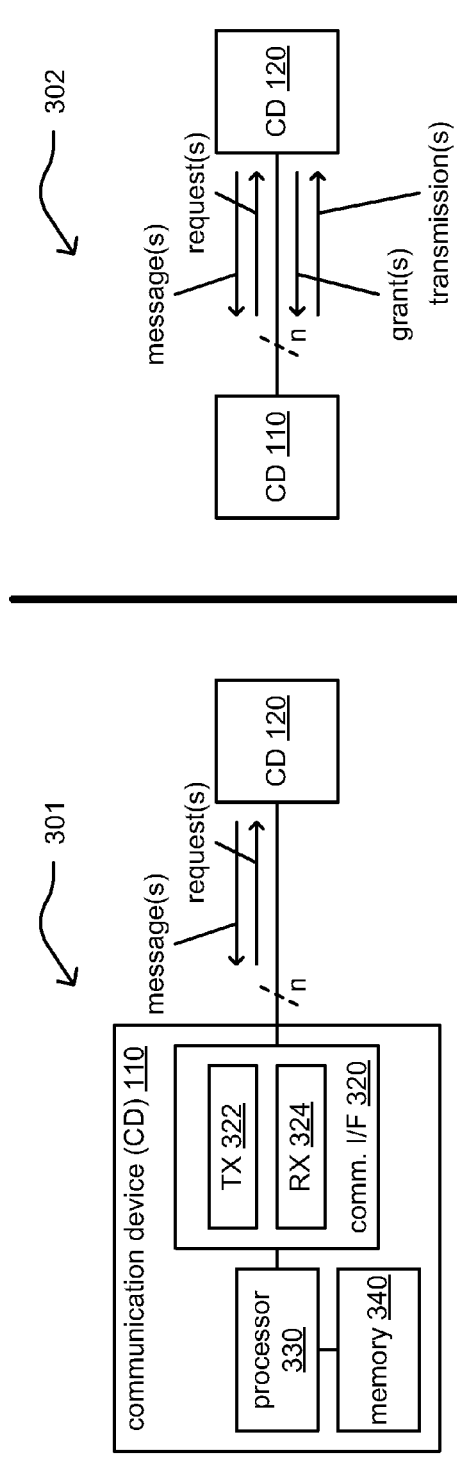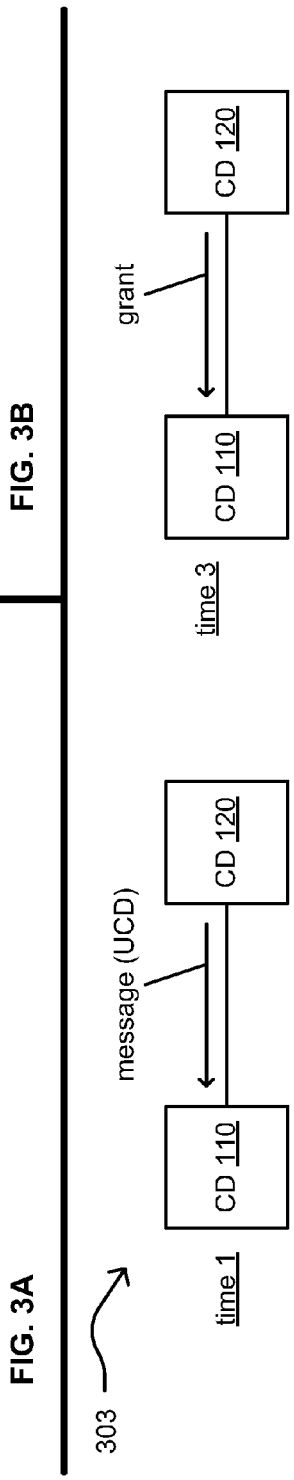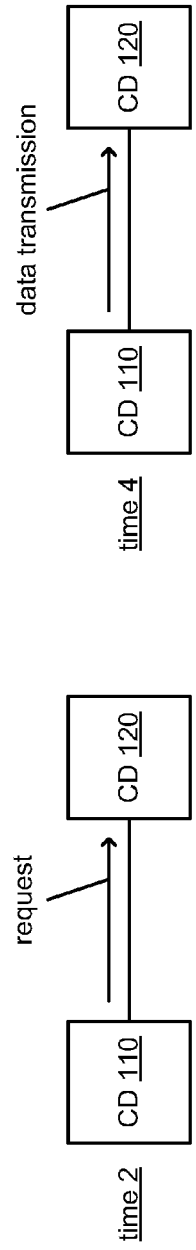
FIG. 3A
FIG. 3B
FIG. 3C

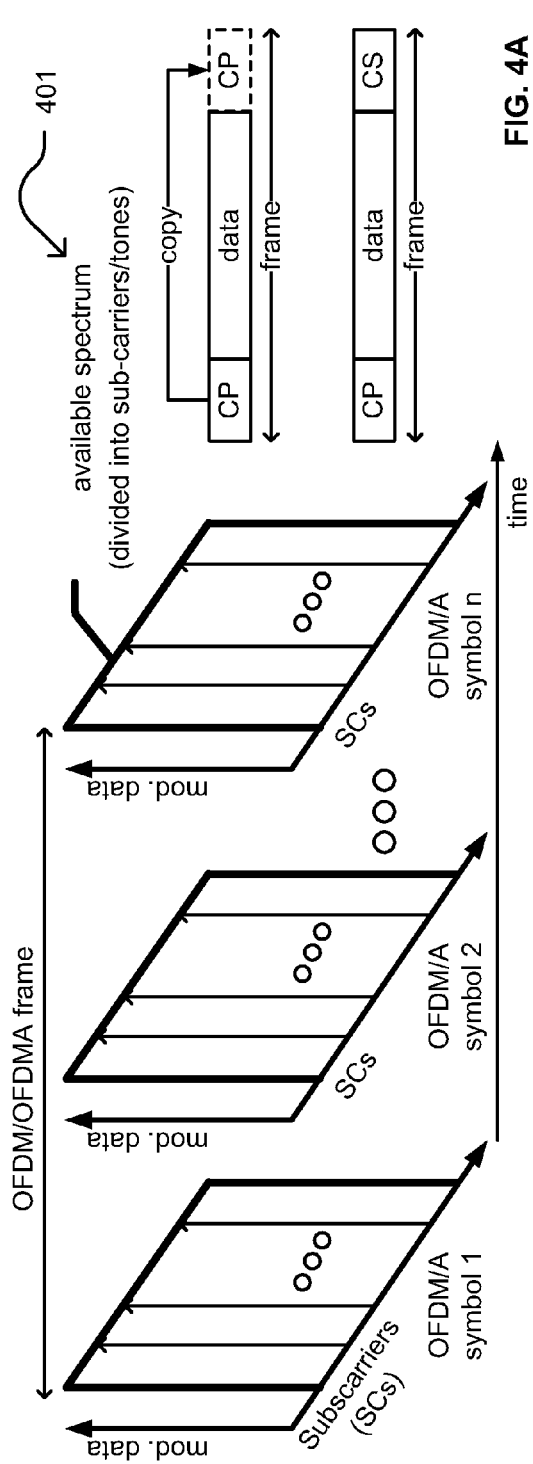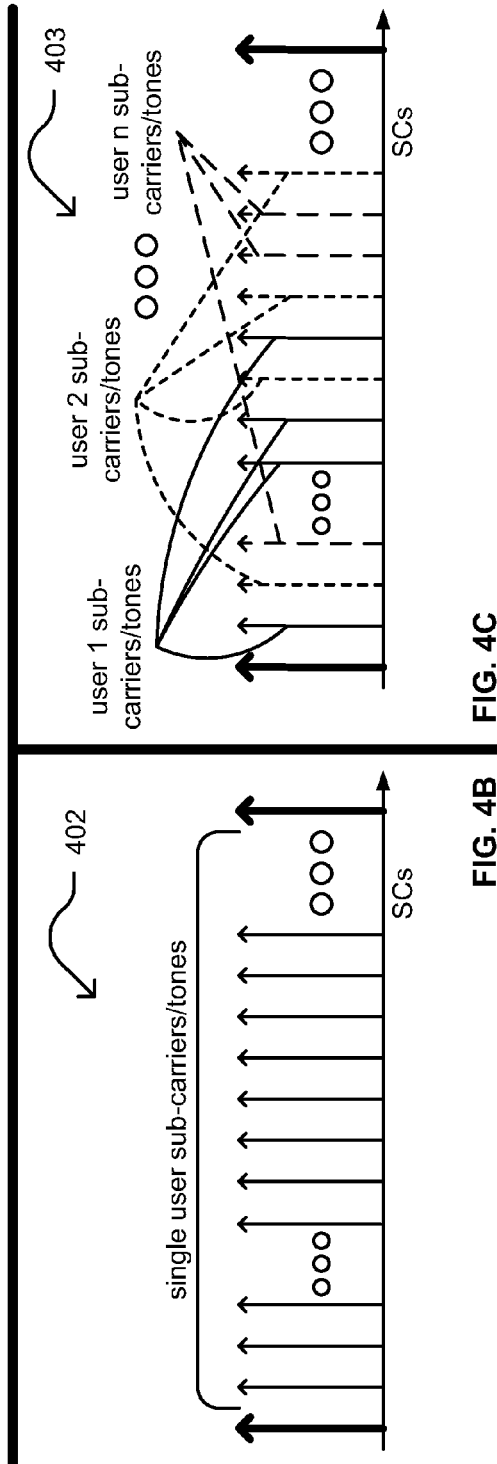
FIG. 4A
FIG. 4B
FIG. 4C

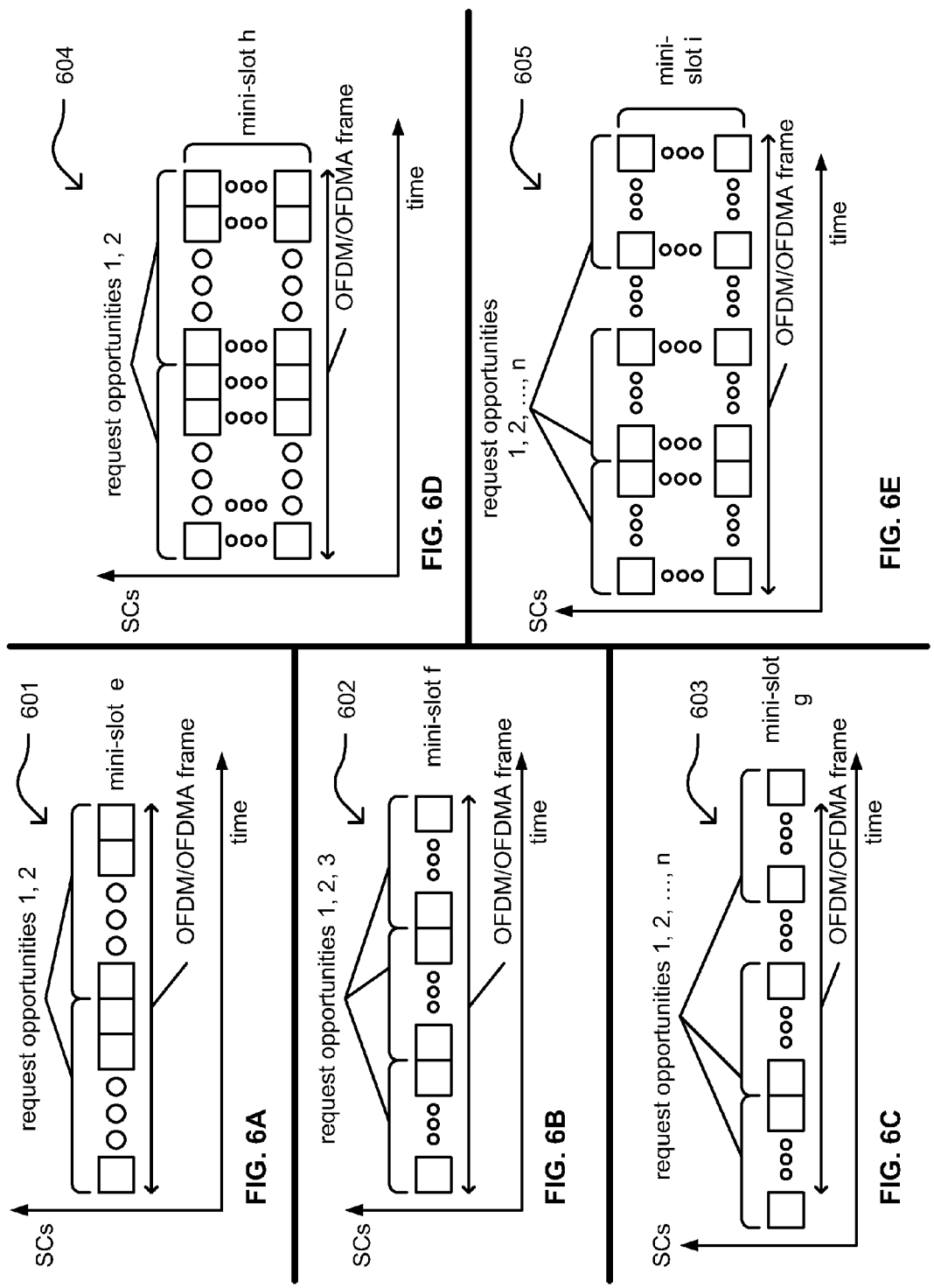

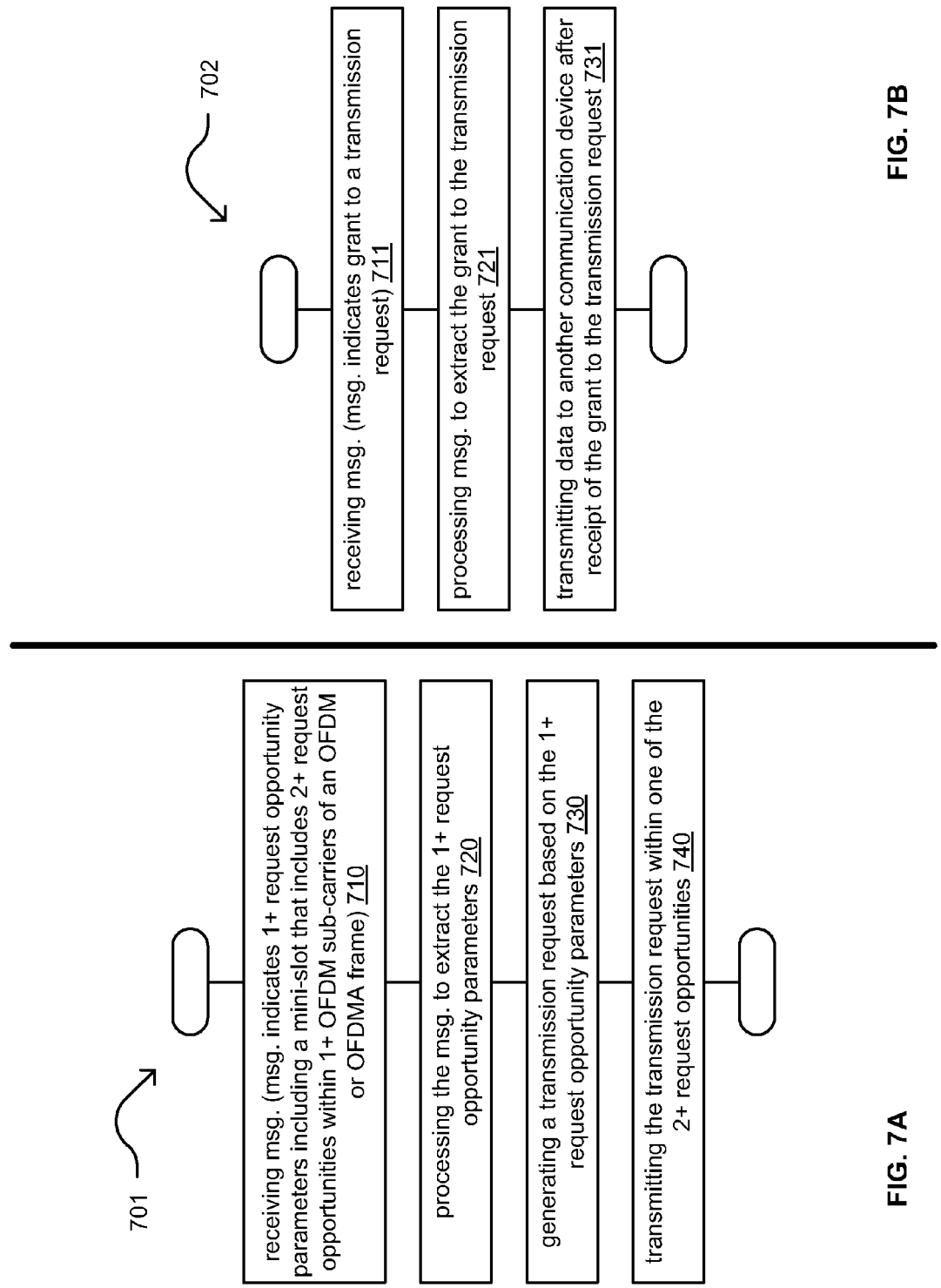

HALF-FRAME REQUEST OPPORTUNITIES AND OPERATION WITHIN WIRED AND/OR WIRELESS COMMUNICATION SYSTEMS

CROSS REFERENCE TO RELATED PATENTS/PATENT APPLICATIONS

Provisional Priority Claims

The present U.S. Utility Patent Application claims priority pursuant to 35 U.S.C. §119(e) to U.S. Provisional Application No. 61/769,380, entitled "Half-frame request opportunities and operation within wired and/or wireless communication systems," filed Feb. 26, 2013; and U.S. Provisional Application No. 61/939,042, entitled "Half-frame request opportunities and operation within wired and/or wireless communication systems," filed Feb. 12, 2014, both of which are hereby incorporated herein by reference in their entirety and made part of the present U.S. Utility Patent Application for all purposes.

BACKGROUND

1. Technical Field

The present disclosure relates generally to communication systems; and, more particularly, to transmission requesting and granting within such communication systems.

2. Description Of Related Art

Data communication systems have been under continual development for many years. The primary goal within such communication systems is to transmit information successfully between devices. The performance of certain communication systems degrades without coordination of transmissions between devices. For example, in a communication system that includes a one to many topology, such that one device communicates with multiple other devices, coordination is made so that the one device does not receive transmissions from so many of the multiple other devices that those received transmissions cannot properly receive, demodulate, decode, etc. those transmissions.

Some devices attempt to coordinate transmissions with other devices within prior communication systems and/or communication protocols, but they do not have adequate capabilities to do so within new and developing types of communication systems and/or communication protocols. Coordination of communications between the various devices becomes more important as the number of total devices within the communication system increases. Current practices do not provide an adequate means for effective coordination of the various transmissions within such communication systems.

BRIEF DESCRIPTION OF THE SEVERAL VIEWS OF THE DRAWINGS

FIG. 3A is a diagram illustrating a communication device operative within one or more communication systems.

FIG. 3B is a diagram illustrating an example of operation of a communication device within one or more communication systems.

FIG. 3C is a diagram illustrating another example of operation of a communication device within one or more communication systems.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 6A is a diagram illustrating an example of request opportunities within a mini-slot.

FIG. 6B is a diagram illustrating another example of request opportunities within a mini-slot.

FIG. 6C is a diagram illustrating another example of request opportunities within a mini-slot.

FIG. 6D is a diagram illustrating another example of request opportunities within a mini-slot.

FIG. 6E is a diagram illustrating another example of request opportunities within a mini-slot.

FIG. 7A is a diagram illustrating an embodiment of a method for execution by one or more communication devices.

FIG. 7B is a diagram illustrating another embodiment of a method for execution by one or more communication devices.

DETAILED DESCRIPTION

Figure 1:
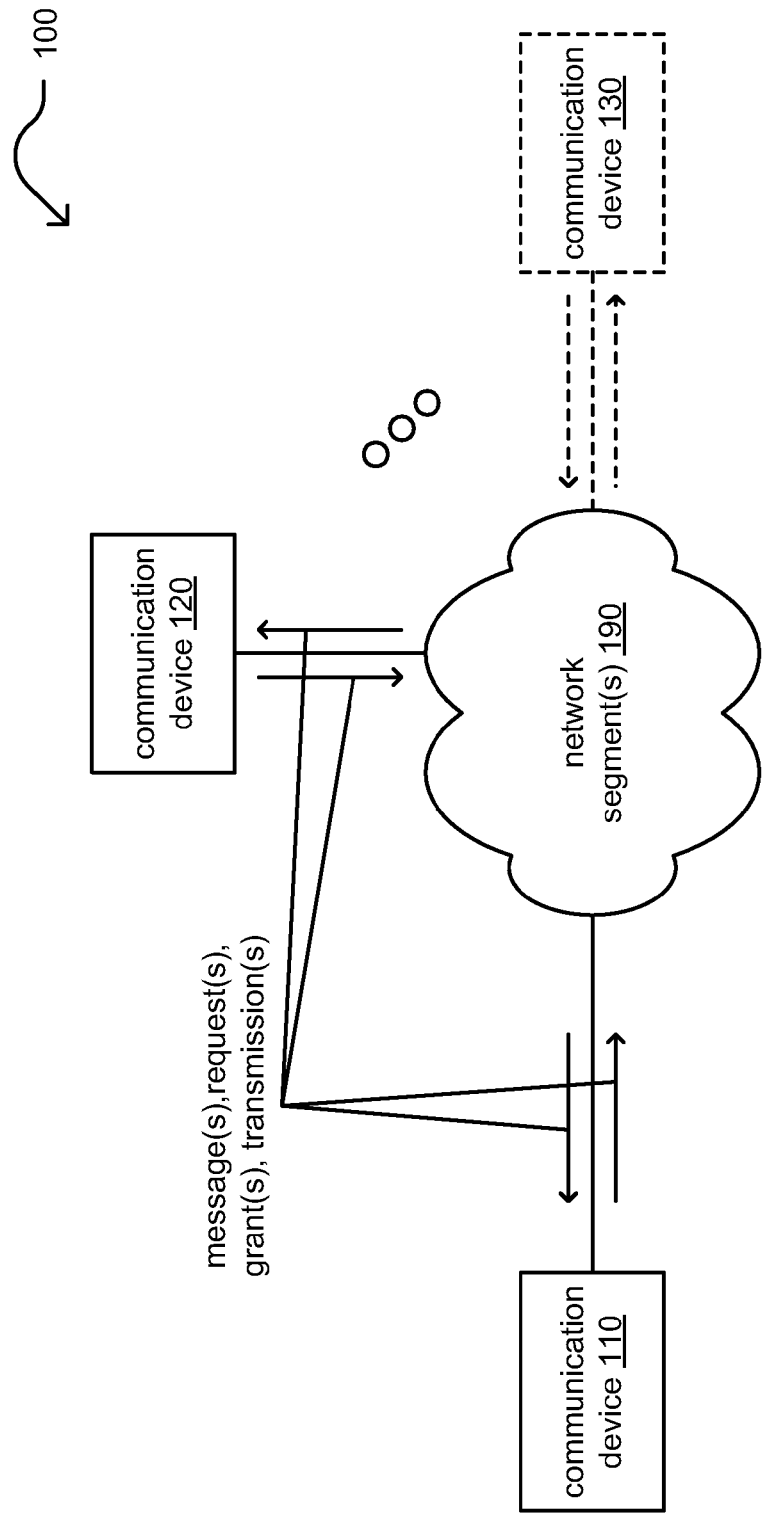
FIG. 1 is a diagram illustrating an embodiment of one or more communication systems.

FIG. 1 is a diagram illustrating an embodiment 100 of one or more communication systems. One or more network segments 190 provide communication inter-connectivity for at least two communication devices 110 and 120. Note that general reference to a communication device may be made generally herein using the term 'device' (e.g., device 110 when referring to communication device 110, or devices 110 and 120 when referring to communication devices 110 and 120). Generally speaking, any desired number of communication devices are included within one or more communication systems (e.g., as shown by communication device 130). Some or all the various communication devices 110-130 include capability to operate within at least one type of communication system that may have a one to many configuration such that one device (e.g., communication device 110) communicates with multiple other devices (e.g., communication devices 120, 130, and/or even more other devices).

The various communication links within the one or more network segments 190 may be implemented using any of a variety of communication media including communication links implemented as wireless, wired, optical, satellite, microwave, etc. communication links. Also, in some instances, communication links of different types may cooperatively form a connection pathway between any two communication devices. Considering one possible example, a communication pathway between devices 110 and 120 may include some segments of wired communication links and other segments of optical communication links. Note also that the devices 110-130 may be of a variety of types of devices including stationary devices, mobile devices, portable devices, etc. and may support communications for any of a number of services or service flows including data, telephony, television, Internet, media, synchronization, etc.

In an example of operation, device 110 includes a communication interface to support communications with one or more of the other devices 120-130. This communication may be bidirectional/to and from the one or more of the other devices 120-130 or unidirectional (or primarily unidirectional) from the one or more of the other devices 120-130.

Any one of the devices 110-130 is configured to coordinate transmissions with any other of the devices 110-130. For example, device 110 may include a communication interface configured to receive a message from device 120. Such a message may indicate one or more request opportunity parameters by which device 110 may request permission from device 120 to make a transmission to device 120. Generally, a request opportunity is a designated portion of an orthogonal frequency division multiplexing (OFDM) or orthogonal frequency division multiple access (OFDMA) frame that may be used to transmit a request to make a subsequent data transmission. A request opportunity is a portion of a mini-slot within an OFDM or OFDMA frame. A given mini-slot includes two or more (e.g., a plurality) of request opportunities, and that given mini-slot includes one or more orthogonal frequency division multiplexing (OFDM) sub-carriers of the OFDM or OFDMA frame. From certain perspectives, the message received by the device 110 indicates two or more of request opportunities. These two or more request opportunities are characterized by one or more request opportunity parameters including locations of the two or more request opportunities within a mini-slot that spans one or more OFDM sub-carriers of an OFDM or OFDMA frame. These two or more request opportunities may be located within two or more mini-slots.

Examples of such one or more request opportunity parameters may include one or more mini-slots that include one or more request opportunities within a signaling scheme. The signaling scheme may be based on OFDM and/or OFDMA signaling such that a mini-slot corresponds to one or more sub-carriers within the OFDM or OFDMA signaling scheme and spans the OFDM or OFDMA frame (e.g., spans all of the OFDM or OFDMA symbols of the OFDM or OFDMA frame). Two or more request opportunities are included within a mini-slot that is indicated for request opportunity use. For example, a given mini-slot that spans an OFDM or OFDMA frame can include 2 request opportunities, 3 request opportunities, etc. or generally N request opportunities such that N is a positive integer greater than or equal to 2. A mini-slot that is used for request opportunities may be divided into any desired number of portions (e.g., 2, 3, 4, etc. or generally N portions) such that each of the request opportunities within that mini-slot occupies a common fraction of the mini-slot (e.g., each request opportunity occupies ½, ⅓, ¼, etc. or generally 1/N of the mini-slot).

In an example of operation, device 110 includes a communication interface configured to receive such a message indicating one or more request parameters that indicates a mini-slot that includes two or more request opportunities within one or more sub-carriers of an OFDM or OFDMA frame. Device 110 includes a processor that is configured to process the message to extract the one or more request opportunity parameters and to generate a transmission request based on the one or more request opportunity parameters. Then, the communication interface of device 110 is configured to transmit the transmission request within one of the request opportunities. Device 110 may operate cooperatively with device 120 to perform such message and transmission request exchange. Generally, any two devices within the communication system may operate to perform such message and transmission request exchange.

The other device with which device 110 is interacting (e.g., device 120) may transmit another message that indicates a grant to the transmission request. The processor device 110 is configured to process the other message to extract the grant to the transmission request and to direct the communication interface of device 110 to transmit data after receipt of the grant to the transmission request. The interaction between the devices coordinates when data is to be transmitted from one device to another. Device 110 receives information corresponding to two or more request opportunities within an OFDM or OFDMA frame and transmits a transmission request using one of those request opportunities. When permission is granted to device 110 (e.g., by device 120), device 110 transmits data to the granting device (e.g., to device 120). Generally, any two devices within the communication system may operate to perform such message, transmission request, grant, and data exchange.

Figure 2:
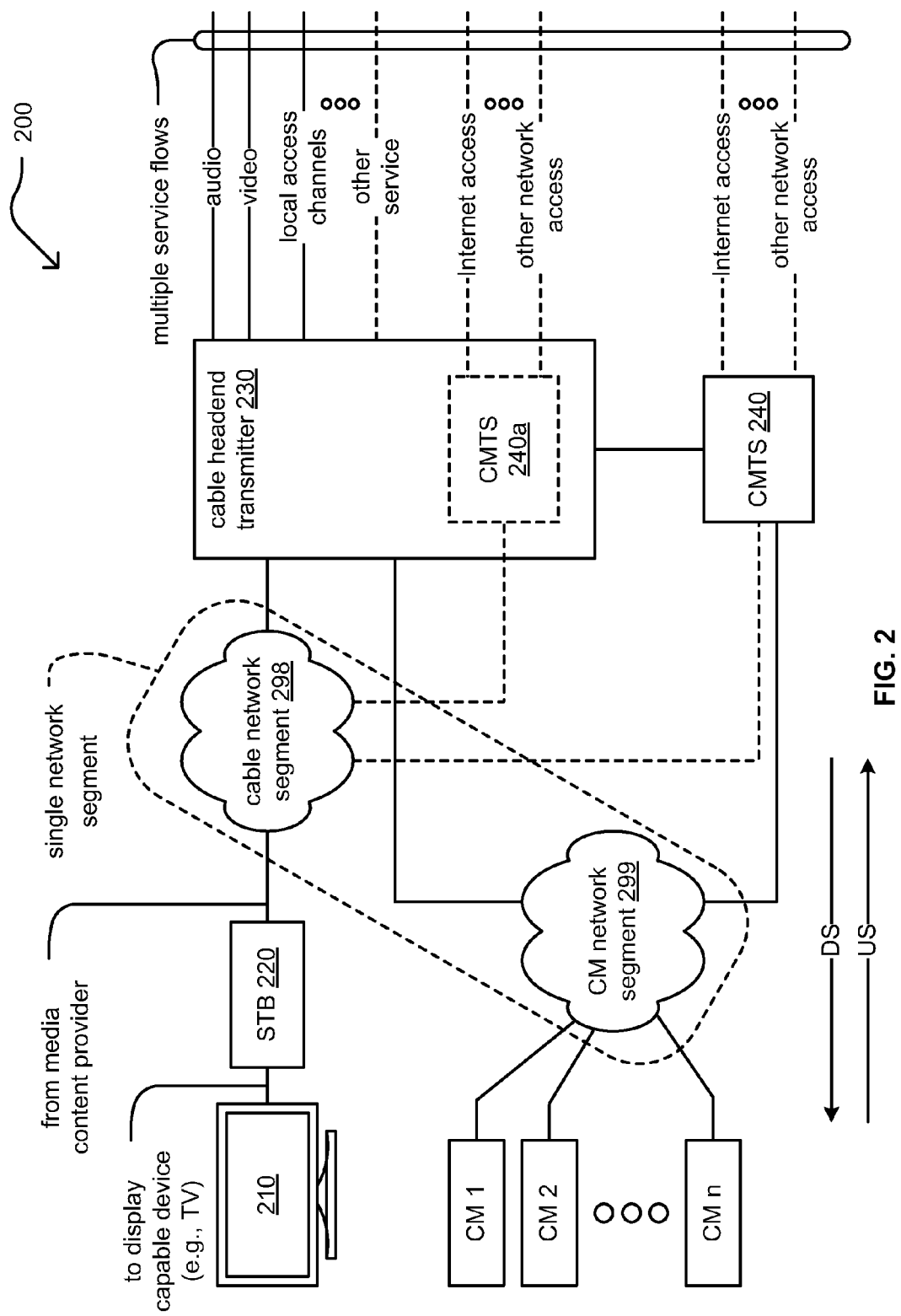
FIG. 2 is a diagram illustrating another embodiment of one or more communication systems.

FIG. 2 is a diagram illustrating another embodiment 200 of one or more communication systems. A cable headend transmitter 230 provides service to a set-top box (STB) 220 via cable network segment 298. The STB 220 provides output to a display capable device 210. The cable headend transmitter 230 can support any of a number of service flows such as audio, video, local access channels, as well as any other service of cable systems. For example, the cable headend transmitter 230 can provide media (e.g., video, image, and/or audio) to the display capable device.

The cable headend transmitter 230 may provide operation of a cable modem termination system (CMTS) 240*a*. For example, the cable headend transmitter 230 may perform such CMTS functionality, or a CMTS may be implemented separately from the cable headend transmitter 230 (e.g., as shown by reference numeral 240). The CMTS 240 can provide network service (e.g., Internet, other network access, etc.) to any number of cable modems (shown as CM 1, CM 2, and up to CM n) via a cable modem (CM) network segment 299. The cable network segment 298 and the CM network segment 299 may be part of a common network or common networks. The cable modem network segment 299 couples the cable modems 1-n to the CMTS (shown as 240 or 240*a*). Such a cable system (e.g., cable network segment 298 and/or CM network segment 299) may generally be referred to as a cable plant and may be implemented, at least in part, as a hybrid fiber-coaxial (HFC) network (e.g., including various wired and/or optical fiber communication segments, light sources, light or photo detection components, etc.).

A CMTS 240 (or 240*a*) is a component that exchanges digital signals with cable modems 1-n on the cable modem network segment 299. Each of the cable modems is coupled to the cable modem network segment 299, and a number of elements may be included within the cable modem network segment 299. For example, routers, splitters, couplers, relays, and amplifiers may be contained within the cable modem network segment 299. Generally speaking, downstream information may be viewed as that which flows from the CMTS 240 to the connected cable modems (e.g., CM 1, CM2, etc.), and upstream information is that which flows from the cable modems to the CMTS 240.

Any of the various devices within these one or more communication systems may be configured to generate and transmit a transmission request within a request opportunity indicated within one or more sub-carriers of an OFDM or OFDMA frame. For example, CMTS 240 may be configured to transmit a message to one of the cable modems (e.g., CM 1) such that the message indicates one or more request opportunity parameters including a mini-slot that includes two or more request opportunities (e.g., 2, 3, 4, etc. or generally N request opportunities such that N is a positive integer greater than or equal to 2) within one or more OFDM sub-carriers of OFDM or OFDMA framing. The cable modem then processes that received message to extract the one or more request opportunity parameters and generates a transmission request based on those one or more request opportunity parameters. The cable modem then uses one of the request opportunities to transmit a transmission request to the CMTS 240.

Then, CMTS 240 may be configured to transmit another message to the cable modem that indicates a grant to the transmission request. A processor of the cable modem is then configured to process this other message to extract the grant to the transmission request and, based thereon, to direct a communication interface of the cable modem to transmit data to the CMTS 240 in accordance with the grant to the transmission request. In some instances, such a data transmission is made based on any of a number of considerations as provided by the CMTS 240 (e.g., including modulation coding set (MCS), data rate, frame format, frame size, coding type, compliance with one or more communication protocols, etc.).

FIG. 3A is a diagram 301 illustrating a communication device (CD) 110 operative within one or more communication systems. The device 110 includes a communication interface 320 and a processor 330. The communication interface 320 includes functionality of a transmitter 322 and a receiver 324 to support communications with one or more other devices within a communication system. The device 110 may also include memory 340 to store information including one or more signals generated by the device 110 or such information received from other devices (e.g., device 120) via one or more communication channels. Memory 340 may also include and store various operational instructions for use by the processor 330 in regards to the processing of messages and/or other received signals and generation of transmission request, data, and/or other signals including those described herein.

Memory 340 may also include and store information related to characteristics associated with OFDM or OFDMA signaling. Memory 340 may also include information associated with an upstream channel descriptor (UCD) or other type of descriptor that characterizes the manner in which communications are performed within the one or more communication systems. Considering the example of a UCD, a UCD may include information that indicates the one or more request opportunity parameters including at least one of one or more mini-slots including the mini-slot, at least one mini-slot size, a mini-slot numbering scheme, a number of mini-slots per OFDM or OFDMA frame, a number of OFDM sub-carriers, and an OFDM or OFDMA frame size. Such a UCD or other type of descriptor that characterizes the manner in which communications are to be performed may be received by device 110 and stored in memory 340 for use in receiving, demodulating, decoding, etc. signals received from other devices and also for generating, formatting, and transmitting signals to be transmitted to other devices.

The communication interface 320 is configured to support communications to and from one or more other devices. The communication interface 320 is configured to receive a message that indicates one or more request opportunity parameters including a mini-slot that includes a plurality of request opportunities within one or more OFDM sub-carriers of an OFDM or OFDMA frame. The processor 330 is configured to process the message to extract the one or more request opportunity parameters. The processor 330 is also configured to generate a transmission request based on the one or more request opportunity parameters. Then, the communication interface 320 is also configured to transmit the transmission request within one of the plurality of request opportunities.

The communication interface 320 may also be configured to receive another message that indicates a grant to the transmission request. The processor 330 is configured to process the other message to extract the grant to the transmission request and to direct the communication interface 320 to transmit data to the other communication device. The data transmitted by communication interface 320 may be data generated by processor 330 within device 110 or data received by device 110 from another source and intended to be relayed or conveyed to the other communication device.

FIG. 3B is a diagram illustrating an example 302 of operation of a communication device within one or more communication systems. Device 110 is configured to support communications to and from one or more other devices, such as device 120. Device 110 is configured to receive a message from device 120 that indicates one or more request opportunity parameters including a mini-slot that includes a plurality of request opportunities within one or more OFDM sub-carriers of an OFDM or OFDMA frame. Device 110 processes the message to extract the one or more request opportunity parameters. Device 110 is also configured to generate a transmission request based on the one or more request opportunity parameters. Then, the device 110 is also configured to transmit the transmission request to the device 120 within one of the plurality of request opportunities.

The device 110 is also configured to receive another message from device 120 that indicates a grant to the transmission request. The device 110 is configured to process the other message to extract the grant to the transmission request and to transmit data to the device 120. The data transmitted by device 110 may be data generated by device 110 or data received by device 110 from another source and intended to be relayed or conveyed to device 120.

FIG. 3C is a diagram illustrating another example 303 of operation of a communication device within one or more communication systems. This diagram shows communications being made at different times between devices 110 and 120. At or during a first time (time 1), device 120 transmits a message to device 110. The message may be an upstream (US) channel descriptor (UCD) that indicates the one or more request opportunity parameters including at least one of one or more mini-slots including the mini-slot, at least one mini-slot size, a mini-slot numbering scheme, a number of mini-slots per OFDM or OFDMA frame, a number of OFDM sub-carriers, and an OFDM or OFDMA frame size. The message may be an alternative type of message that indicates one or more request opportunity parameters including a mini-slot that includes a plurality of request opportunities within one or more OFDM sub-carriers of an OFDM or OFDMA frame.

At or during a second time (time 2), device 110 generates and transmits a transmission request within one of the two or more request opportunities indicated within the message received at or during the first time (time 1). Device 110 generates the transmission request based on the one or more request opportunity parameters indicated within the message received at or during the first time (time 1). For example, device 110 may generate the transmission request based on a particular modulation coding set (MCS), data rate, frame format, frame size, coding type, compliance with one or more communication protocols, etc.

At or during a third time (time 3), device 120 determines whether or not it is permissible to grant approval to the transmission request received at or during the second time (time 2). Determination of whether or not it is permissible to grant approval to the transmission request may be based upon a favorable comparison with one or more considerations. For example, certain considerations may include one or more local operating conditions of device 120 (e.g., processing history, processing patterns, available memory, available processing resources, etc.), one or more remote operating conditions of a communication device located remotely from the communication device such as device 110, one or more system conditions (e.g., signal to noise ratio (SNR), noise, interference, etc. of one or more communication links that connect and/or communicatively couple devices 110 and 120). When device 120 determines that it is permissible to grant approval to the transmission request received at or during the second time (time 2), device 120 transmits a grant to the transmission request at or during the third time (time 3).

At or during a fourth time (time 4), device 110 makes a data transmission to device 120. This data transmission may be made after receipt of the grant to the transmission request being received from device 120 at or during the third time (time 3).

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbol may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM frames are transmitted between a transmitter device and a receiver device, all of the sub-carriers or tones are dedicated for use in transmitting modulated data between the transmitter and receiver devices. In a multiple user system in which one or more OFDM symbols or OFDM frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). An OFDM frame may include more than one OFDM symbol. Similarly, an OFDMA frame may include more than one OFDMA symbol. In addition, such sub-carrier/tone assignment may be dynamic among different respective symbols within a given frame or superframe (e.g., a first assignment for a first OFDMA symbol within a frame, a second assignment for a second OFDMA symbol within the frame, etc.). Generally speaking, an OFDMA symbol is a particular type of OFDM symbol, and general reference to OFDM symbol herein includes both OFDM and OFDMA symbols (and general reference to OFDM frame herein includes both OFDM and OFDMA frames).

Generally, a communication device may be configured to include a processor configured to process received OFDM or OFDMA symbols and/or frames and to generate such OFDM or OFDMA symbols and/or frames. The processor of the communication device is configured to process a received message to extract one or more request opportunity parameters and to generate a transmission request based on those one or more request opportunity parameters. The processor of the communication device is configured to generate the transmission request based on OFDM subcarriers of an OFDM or OFDMA frame that may be indicated within the one or more request opportunity parameters.

The processor of a given communication device may be configured to generate such a message that includes the one or more request opportunity parameters as a multiple user (MU) message based on orthogonal frequency division multiple access (OFDMA) and/or multi-user multiple-input-multiple-output (MU-MIMO) signaling. Alternatively, the processor of a given communication device may be configured to generate such a message that includes the one or more request opportunity parameters as a polling-based message that corresponds to the other communication device and no other communication devices (e.g., in a single user (SU) implementation). A communication interface of such a communication device may be configured to transmit the polling-based message to the other communication device. In such an instance, when a recipient device receives the message that indicates two or more request opportunities within a given mini-slot, the recipient device may select one of the two or more request opportunities for use in transmitting a transmission request while not selecting any other request opportunities indicated within the received message.

The following FIG. 5A, FIG. 5B, FIG. 6A, FIG. 6B, FIG. 6C, FIG. 6D, and FIG. 6E may be understood with reference to the FIG. 4A, FIG. 4B, and FIG. 4C described above that described certain properties and features of OFDM and OFDMA signaling including OFDM sub-carriers, OFDM or OFDMA symbols, OFDM or OFDMA frames and framing, single user (SU) and multiple user (MU) implementations, etc.

Figures 5A, 5B:
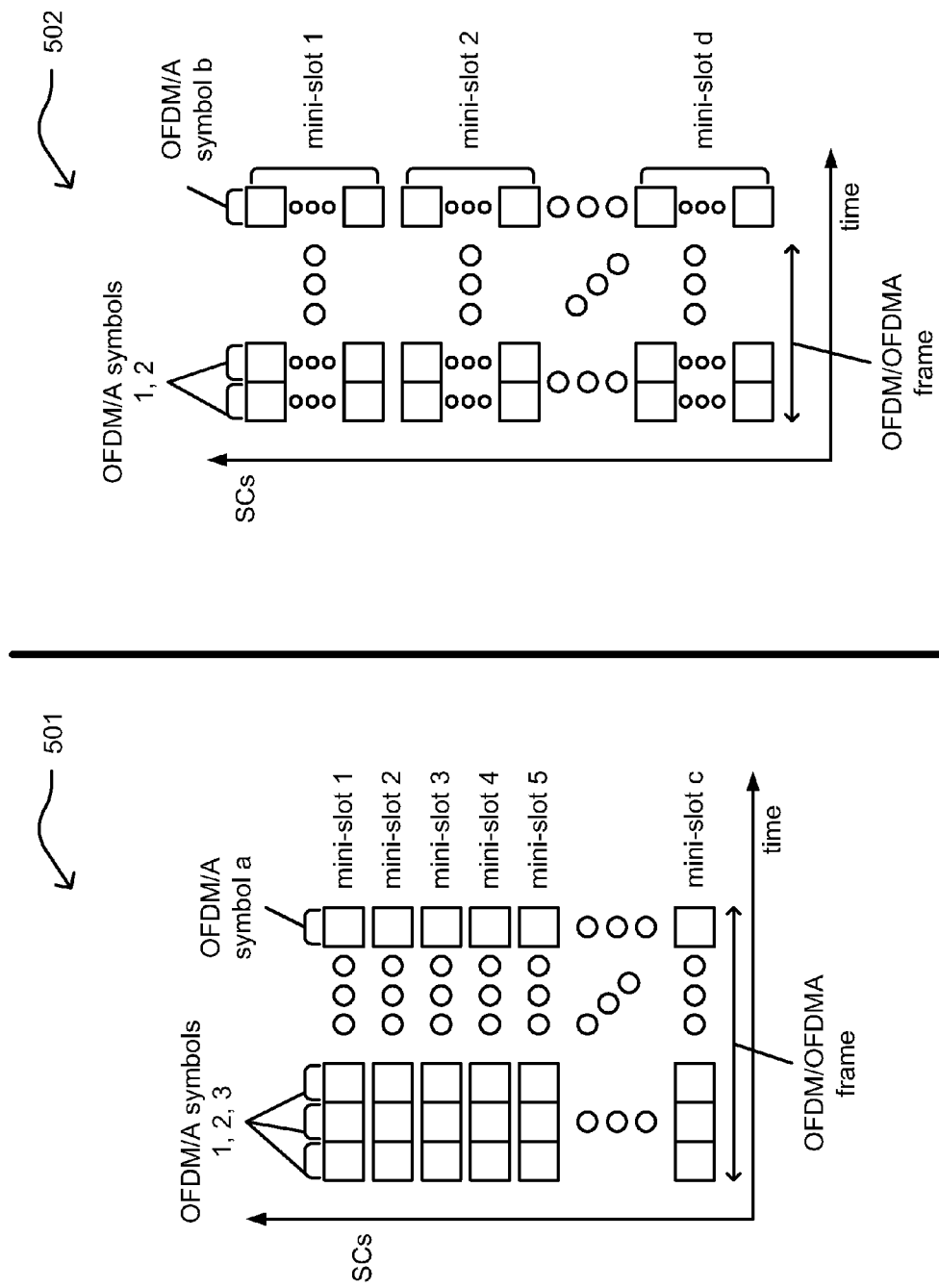
FIG. 5A is a diagram illustrating an example of frame and mini-slot structure.
FIG. 5B is a diagram illustrating another example of frame and mini-slot structure.

FIG. 5A is a diagram illustrating an example 501 of frame and mini-slot structure. This diagram shows an OFDM or OFDMA frame composed of 'a' OFDM or OFDMA symbols (e.g., where 'a' is generally any desired positive integer number that is greater than or equal to 2). Each sub-carrier corresponds to one respective mini-slot in this diagram. A total of 'c' sub-carriers are employed such that each numbered mini-slot corresponds to one correspondingly numbered sub-carrier. For example, mini-slot 1 corresponds to sub-carrier 1, mini-slot 2 corresponds to mini-slot 2, and so on up until sub-carrier 'c' corresponds to mini-slot 'c'. Generally, any one of the particular mini-slots may be designated as including two or more request opportunities. A device may select any one or more of the sub-carriers associated with a given request opportunity to transmit modulated data that includes a transmission request. This diagram shows the example 501 where each sub-carrier corresponds to a respective one mini-slot.

FIG. 5B is a diagram illustrating another example 502 of frame and mini-slot structure. This diagram shows an OFDM or OFDMA frame composed of 'b' OFDM or OFDMA symbols (e.g., where 'b' is generally any desired positive integer number that is greater than or equal to 2). In this diagram, each respective mini-slot includes two or more sub-carriers. For example, mini-slot 1 includes 2 or more sub-carriers, mini-slot 2 includes 2 or more sub-carriers, and so on up until mini-slot 'd' includes 2 or more sub-carriers. In one implementation, each of the respective mini-slots includes the same, common number of sub-carriers (e.g., each of mini-slot 1, 2, etc. includes 2, 3, or 'x' sub-carriers, where 'x' is generally any desired positive integer number that is greater than or equal to 2). This diagram shows the example 502 were each mini-slot includes two or more sub-carriers. Generally, any one of the particular mini-slots may be designated as including two or more request opportunities.

In the following FIG. 6A, FIG. 6B, FIG. 6C, FIG. 6D, and FIG. 6E described below, one respective mini-slot is shown in each respective diagram. Note that one or more other mini-slots may be included above and/or below the particular mini-slot depicted in a given diagram. Different characteristics and features of various types of mini-slots and the partitioning of such mini-slots are shown in the various diagrams.

FIG. 6A is a diagram illustrating an example 601 of request opportunities within a mini-slot. This diagram shows 2 request opportunities implemented within one mini-slot 'e'. In this example 601, each of the respective request opportunities may constitute one-half of an OFDM or OFDMA frame, and each of the respective request opportunities may be of a common size (e.g., half-frame size). However, in other implementations, note that the 2 respective request opportunities need not necessarily be of the same size (e.g., one of the request opportunities may be one-third frame size, and the other one of the request opportunities may be two-thirds frame size in an alternative embodiment).

FIG. 6B is a diagram illustrating another example 602 of request opportunities within a mini-slot. This diagram shows 3 request opportunities implemented within one mini-slot 'f'. In this example 602, each of the respective request opportunities may constitute one-third of an OFDM or OFDMA frame, and each of the respective request opportunities may be of a common size (e.g., one-third frame size). However, in other implementations, note that the 3 respective request opportunities need not necessarily be of the same size. Any desired subdivision of a mini-slot into three request opportunities may be performed based on OFDM or OFDMA framing.

FIG. 6C is a diagram illustrating another example 603 of request opportunities within a mini-slot. This diagram shows 'n' request opportunities implemented within one mini-slot 'g'. In this example 603, each of the respective request opportunities may constitute 1/n of an OFDM or OFDMA frame, and each of the respective request opportunities may be of a common size (e.g., 1/n frame size, where n is generally any positive integer greater than or equal to 2).

FIG. 6D is a diagram illustrating another example 604 of request opportunities within a mini-slot. This diagram shows 2 request opportunities implemented within one mini-slot 'h' that is composed of two or more sub-carriers. In this example 604, each of the respective request opportunities may constitute one-half of an OFDM or OFDMA frame, and each of the respective request opportunities may be of a common size (e.g., half-frame size). However, comparing this example 604 with the example 601 of FIG. 6A, this example 604 allows for more sub-carriers to be used to transmit a request opportunity than the example 601 of FIG. 6A. Also, in alternative implementations, note that the 2 request opportunities need not necessarily be of the same size. Generally, any desired division of the mini-slot 'h' into 2 request opportunities may be performed, even when the 2 request opportunities are of unequal size.

FIG. 6E is a diagram illustrating another example 605 of request opportunities within a mini-slot. This diagram shows 'n' request opportunities implemented within one mini-slot 'i' that is composed of two or more sub-carriers. In this example 605, each of the respective request opportunities may constitute 1/n of an OFDM or OFDMA frame, and each of the respective request opportunities may be of a common size (e.g., 1/n frame size, where n is generally any positive integer greater than or equal to 2). Also, in alternative implementations, note that the n request opportunities need not necessarily be of the same size. Generally, any desired division of the mini-slot 'i' into n request opportunities may be performed, even when the n request opportunities are of unequal size.

Note also that more than one mini-slot may be indicated for request opportunity use. When more than one mini-slot is used for request opportunities, they may be adjacently located mini-slots, or they may be non-adjacently located such that one or more other mini-slots that are used for other purposes (e.g., data transmissions, other signaling purposes, etc.) may be located in between two different mini-slots that are used for request opportunities. Note also that certain implementations may include only a single request opportunity per mini-slot. However, most implementations will include two or more request opportunities within any given mini-slot that is used for request opportunities. Note also that the number of request opportunities included within two or more mini-slots dedicated for request opportunity use will generally be the same (e.g., 2 request opportunities per mini-slot used for request opportunities, 3 request opportunities per mini-slot used for request opportunities, etc.). While partitioning different mini-slots used for request opportunities differently is permissible (e.g., partitioning a first mini-slot to include 2 request opportunities and a second mini-slot to include 3 request opportunities), the additional coordination and signaling required to perform such an implementation may be undesirable in certain applications. As such, generally, the number of request opportunities included within two or more mini-slots dedicated for request opportunity use will generally be the same.

In certain embodiments, mini-slots will have some particular characteristics and features. In some implementations, a mini-slot occupies a full frame time (e.g., mini-slot spans the entirety of one or more sub-carriers of an OFDM or OFDMA frame). The mini-slot numbering scheme is constant from frame to frame (e.g., same in each of a number of OFDM or OFDMA frames if and until such parameters get updated). Note also that the mini-slot numbering scheme is unaffected by the number of request regions or request opportunities that are granted (e.g., 2 per mini-slot, 3 per mini-slot, etc.). Also, there will be the same number of mini-slots in a given OFDM or OFDMA frame. The mini-slots will also start and end on the same subcarrier boundaries in every frame.

Note also that any of these parameters may be modified or updated via an upstream (US) channel descriptor (UCD) that updates such parameters. For example, any one or more parameters are changeable via a UCD change with appropriate wait times, etc. For example, request opportunity parameters are communicated in an upstream (US) channel descriptor (UCD) transmitted from one device to another. These request opportunity parameters include a number of subcarriers N per request opportunity and whether an opportunity consumes a full frame or a half-frame (or even less than a half-frame, such as 3, 4, or n where n is generally any positive integer greater than or equal to 2).

In the example of when a request opportunity consumes a half-frame, then the mini-slots still occupies a full frame time (e.g., mini-slot spans the entirety of one or more sub-carriers of an OFDM or OFDMA frame). For broadcast or multicast service identifiers (SIDs), the granted region used for request opportunities is broken down with two opportunities per N subcarriers (e.g., one in the first half of the frame and one in the second half of the frame). For unicast SIDs, there may still be 2 opportunities per N subcarriers. There are several ways that this may be implemented. Both request opportunities may belong to the same SID, such that a device (e.g., cable modem) uses one and wastes the other.

If desired, both opportunities may belong to the same device (e.g., cable modem). The device (e.g., cable modem) uses one for the SID assigned, and optionally uses the other to request for a different flow within the same device (e.g., cable modem). Alternatively, each request opportunity may be allowed to be granted to a different device (e.g., cable modem). The mini-slot numbering also will not change in this implementation. Some other existing field within the message that includes the request opportunity parameters can be used to indicate whether a given SID is being assigned a first opportunity or a second opportunity out of the assigned mini-slots. The message may be implemented as a MAP message based on one or more version of the Data Over Cable Service Interface Specification (DOCSIS). Note also that an existing interval usage code (IUC) may be used to indicate a first opportunity (e.g., opportunity A), and a new IUC may be defined or used to indicate a second opportunity (e.g., opportunity B).

FIG. 7A is a diagram illustrating an embodiment of a method 701 for execution by one or more communication devices. The method 701 operates by receiving a message that indicates one or more request opportunity parameters including a mini-slot that includes a plurality of request opportunities within one or more orthogonal frequency division multiplexing (OFDM) sub-carriers of an OFDM or orthogonal frequency division multiple access (OFDMA) frame (block 710). The operation of block 710 may be performed via a communication interface of the communication device. The method 701 continues by processing the message to extract the one or more request opportunity parameters (block 720).

The method 701 then operates by generating a transmission request based on the one or more request opportunity parameters (block 730). The method 701 continues by transmitting the transmission request within one of the plurality of request opportunities (block 740).

FIG. 7B is a diagram illustrating another embodiment of a method 702 for execution by one or more communication devices. The method 702 operates by receiving a message that indicates a grant to a transmission request (block 711). The grant to the transmission request may be in response to a transmission request transmitted from a device performing the method 702. The operation of block 711 may be performed via a communication interface of the communication device.

The method 702 then operates by processing the other message to extract the grant to the transmission request (block 721). The method 702 then continues by transmitting data to another communication device after receipt of the grant to the transmission request (block 731).

Figures 8A, 8B:
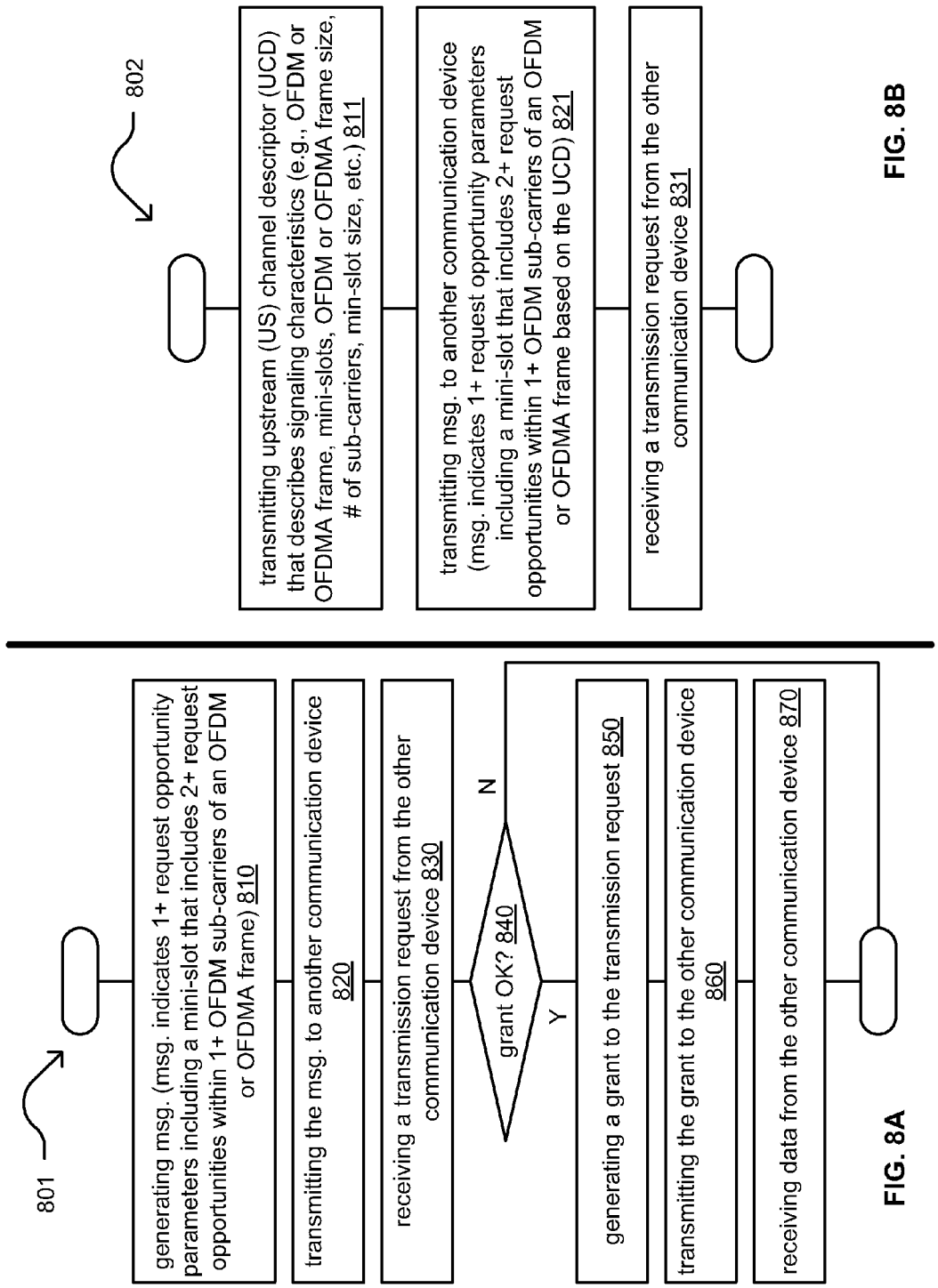
FIG. 8A is a diagram illustrating an embodiment of a method for execution by one or more communication devices.
FIG. 8B is a diagram illustrating another embodiment of a method for execution by one or more communication devices.

FIG. 8A is a diagram illustrating an embodiment of a method 801 for execution by one or more communication devices. The method 801 operates by generating a message that indicates one or more request opportunity parameters including a mini-slot that includes a plurality of request opportunities within one or more OFDM sub-carriers of an OFDM or OFDMA frame (block 810).

The method 801 then continues by transmitting the message to another communication device (block 820). The method 801 then operates by receiving a transmission request from the other communication device (block 830). The transmission request may be in response to the message transmitted to the other communication device.

If the method 801 determines that it is acceptable to grant a request to the transmission request based on a favorable comparison of one or more conditions (decision block 840). For example, one or more local operating conditions of a communication device performing the method 801 or one or more other communication devices performing the method 801 (e.g., processing history, processing patterns, available memory, available processing resources, etc.), one or more remote operating conditions of a communication device located remotely from the communication device performing the method 801, one or more system conditions (e.g., signal to noise ratio (SNR), noise, interference, etc. of one or more communication links). When the method 801 determines it is not permissible to grant a request to the transmission request (decision block 840), the method 801 ends.

However, when the method 801 determines that it is permissible to grant a request to the transmission request (decision block 840), then the method operates by generating a grant to the transmission request (block 850). The method 801 then continues by transmitting the grant to the other communication device (block 860). The method 801 then operates by receiving data from the other communication device (block 870). The data is transmitted from the other communication device in response to the grant that is transmitted to the other communication device.

FIG. 8B is a diagram illustrating another embodiment of a method 802 for execution by one or more communication devices. The method 802 operates by transmitting an upstream channel descriptor (UCD) that describes one or more signaling characteristics (block 811). Examples of such one or more signaling characteristics may include one or more request opportunity parameters including at least one of one or more mini-slots including the mini-slot, at least one mini-slot size, a mini-slot numbering scheme, a number of mini-slots per OFDM or OFDMA frame, a number of OFDM sub-carriers, an OFDM or OFDMA frame size, etc. and/or other signaling characteristic(s).

The method 802 then operates by transmitting a message to another communication device (block 821). The message indicates one or more request opportunity parameters including a mini-slot that includes two or more request opportunities within one or more OFDM sub-carriers of an OFDM or OFDMA frame that are based on the UCD received in block 821. The method 802 then continues by receiving a transmission request from the other communication device (block 831).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A communication device comprising:
a communication interface configured to:
receive, from another communication device, a message that indicates a plurality of request opportunities, wherein the plurality of request opportunities are characterized by one or more request opportunity parameters including locations of the plurality of request opportunities within a mini-slot that spans orthogonal frequency division multiplexing (OFDM) sub-carriers of an OFDM or orthogonal frequency division multiple access (OFDMA) frame and, for each request opportunity of the plurality of request opportunities, information that indicates whether the each request opportunity of the plurality of request opportunities consumes full OFDM or OFDMA frame or a corresponding identified portion of the OFDM or OFDMA frame that is less than the full OFDM or OFDMA frame, wherein each request opportunity of the plurality of request opportunities has a common size within the OFDMA frame being 1/M of the OFDMA frame, wherein M is a positive integer greater than or equal to 2; and
transmit, to the another communication device, a transmission request within one of the plurality of request opportunities; and
a processor configured to:
process the message to extract the one or more request opportunity parameters;
generate the transmission request based on the one or more request opportunity parameters; and
process the message to determine whether the plurality of request opportunities are based on a common unicast service identifier (SID), and when the plurality of request opportunities are determined to be based on the common unicast SID, select the one of the plurality of request opportunities that occupies less than all of the OFDM sub-carriers of the mini-slot for use to transmit the transmission request.

2. The communication device of claim 1 further comprising:
the communication interface configured to:
receive another message that indicates a grant to the transmission request; and
transmit data to the another communication device after receipt of the grant to the transmission request; and
the processor configured to:
process the other message to extract the grant to the transmission request; and
direct the communication interface to transmit the data to the another communication device.

3. The communication device of claim 1, wherein the message comprising an upstream channel descriptor (UCD) that indicates the one or more request opportunity parameters including at least one of one or more mini-slots including the mini-slot, at least one mini-slot size, a mini-slot numbering scheme, a number of mini-slots per the OFDM or OFDMA frame, a number of OFDM sub-carriers, or an OFDM or OFDMA frame size.

4. The communication device of claim 1, wherein the mini-slot comprising two or more request opportunities within the OFDM sub-carriers of the OFDM or OFDMA frame, and the one or more request opportunity parameters comprising a first location of a first request opportunity of the plurality of request opportunities that consumes a first identified portion of the OFDM or OFDMA frame that is less than the full OFDM or OFDMA frame and a second location of a second request opportunity of the plurality of request opportunities that consumes a second identified portion of the OFDM or OFDMA frame that is less than the full OFDM or OFDMA frame.

5. The communication device of claim 1 further comprising:

the communication interface configured to receive another message that indicates another one or more request opportunity parameters including another mini-slot that includes another plurality of request opportunities within the OFDM sub-carriers or another OFDM sub-carriers of the OFDM or the OFDMA frame, wherein the mini-slot and the other mini-slot include a same number of request opportunities, N, such that N is a positive integer greater than or equal to 2.

6. The communication device of claim 1 further comprising:
the processor configured to:
process the message to determine when the message is polling-based and corresponds to the communication device and no other communication devices;
select one of the plurality of request opportunities when the message is polling-based; and
generate the transmission request based on a selected one of the plurality of request opportunities when the message is polling-based; and
the communication interface configured to transmit the transmission request within the selected one of the plurality of request opportunities when the message is polling-based.

7. The communication device of claim 1 further comprising:
a cable modem, wherein the another communication device is a cable headend transmitter or a cable modem termination system (CMTS).

8. The communication device of claim 1 further comprising:
the communication interface configured to support communications within at least one of a satellite communication system, a wireless communication system, a wired communication system, a fiber-optic communication system, or a mobile communication system.

9. A communication device comprising:
a processor configured to:
generate a message that indicates a plurality of request opportunities, wherein the plurality of request opportunities are characterized by one or more request opportunity parameters including locations of the plurality of request opportunities within a mini-slot that spans orthogonal frequency division multiplexing (OFDM) sub-carriers of an OFDM or orthogonal frequency division multiple access (OFDMA) frame and, for each request opportunity of the plurality of request opportunities, information that indicates whether the each request opportunity of the plurality of request opportunities consumes full OFDM or OFDMA frame or a corresponding identified portion of the OFDM or OFDMA frame that is less than the full OFDM or OFDMA frame, wherein each request opportunity of the plurality of request opportunities has a common size within the OFDMA frame being 1/M of the OFDMA frame, wherein M is a positive integer greater than or equal to 2; and
generate a grant to a transmission request; and
a communication interface configured to:
transmit the message to another communication device;
receive the transmission request from the another communication device, wherein the transmission request is within one of the plurality of request opportunities, and wherein the transmission request is received via the one of the plurality of request opportunities that occupies less than all of the OFDM sub-carriers of the mini-slot when the plurality of request opportunities are based on a common unicast service identifier (SID);
transmit the grant to the transmission request; and
receive data from the another communication device after transmission of the grant to the transmission request.

10. The communication device of claim 9 further comprising:
the processor configured to generate another message that indicates another plurality of request opportunities, wherein the other plurality of request opportunities are characterized by another one or more request opportunity parameters including locations of the other plurality of request opportunities within another mini-slot that spans other OFDM sub-carriers of another OFDM or OFDMA frame, wherein the mini-slot and the other mini-slot include a same number of request opportunities, N, such that N is a positive integer greater than or equal to 2.

11. The communication device of claim 9 further comprising:
the processor configured to generate the message as a polling-based message that corresponds to the another communication device and no other communication devices; and
the communication interface configured to transmit the polling-based message to the another communication device.

12. The communication device of claim 9, wherein the message comprising an upstream channel descriptor (UCD) that indicates the one or more request opportunity parameters including at least one of one or more mini-slots including the mini-slot, at least one mini-slot size, a mini-slot numbering scheme, a number of mini-slots per OFDM or OFDMA frame, a number of OFDM sub-carriers, or an OFDM or OFDMA frame size.

13. The communication device of claim 9 further comprising:
a cable headend transmitter or a cable modem termination system (CMTS), wherein the another communication device is a cable modem.

14. The communication device of claim 9 further comprising:
the communication interface configured to support communications within at least one of a satellite communication system, a wireless communication system, a wired communication system, a fiber-optic communication system, or a mobile communication system.

15. A method for execution by a communication device, the method comprising:
via a communication interface of the communication device and from another communication device, receiving a message that indicates a plurality of request opportunities, wherein the plurality of request opportunities are characterized by one or more request opportunity parameters including locations of the plurality of request opportunities within a mini-slot that spans orthogonal frequency division multiplexing (OFDM) sub-carriers of an OFDM or orthogonal frequency division multiple access (OFDMA) frame and, for each request opportunity of the plurality of request opportunities, information that indicates whether the each request opportunity of the plurality of request opportunities consumes the OFDM or OFDMA frame or a corresponding identified portion of the OFDM or OFDMA frame that is less than the full OFDM or OFDMA frame, wherein each request opportunity of the plurality of request opportunities has a common size within the OFDMA frame being 1/M of the OFDMA frame, wherein M is a positive integer greater than or equal to 2;

processing the message to extract the one or more request opportunity parameters;

generating a transmission request based on the one or more request opportunity parameters;

transmitting the transmission request within one of the plurality of request opportunities to the another communication device; and process the message to determine whether the plurality of request opportunities are based on a common unicast service identifier (SID), and when the plurality of request opportunities are determined to be based on the common unicast SID, select the one of the plurality of request opportunities that occupies less than all of the OFDM sub-carriers of the mini-slot for use to transmit the transmission request.

16. The method of claim 15 further comprising:

via the communication interface of the communication device and from another communication device, receiving another message that indicates a grant to the transmission request;

processing the other message to extract the grant to the transmission request; and transmitting data to the another communication device after receipt of the grant to the transmission request.

17. The method of claim 15, wherein the message comprising an upstream channel descriptor (UCD) that indicates the one or more request opportunity parameters including at least one of one or more mini-slots including the mini-slot, at least one mini-slot size, a mini-slot numbering scheme, a number of mini-slots per the OFDM or OFDMA frame, a number of OFDM sub-carriers, or an OFDM or OFDMA frame size.

18. The method of claim 15 further comprising:

via the communication interface of the communication device, receiving another message that indicates another one or more request opportunity parameters including another mini-slot that includes another plurality of request opportunities within the OFDM sub-carriers or another OFDM sub-carriers of the OFDM or the OFDMA frame, wherein the mini-slot and the other mini-slot include a same number of request opportunities, N, such that N is a positive integer greater than or equal to 2.

19. The method of claim 15, wherein the communication device is a cable modem, and the another communication device is a cable headend transmitter or a cable modem termination system (CMTS).

20. The method of claim 15 further comprising:

operating the communication interface of the communication device to support communications within at least one of a satellite communication system, a wireless communication system, a wired communication system, a fiber-optic communication system, or a mobile communication system.

* * * * *